United States Patent

[11] 3,630,098

[72] Inventor David F. Oxley
    Welwyn Garden City, England
[21] Appl. No. 15,116
[22] Filed Feb. 27, 1970
[45] Patented Dec. 28, 1971
[73] Assignee Imperial Chemical Industries Limited
    London, England
[32] Priority Mar. 26, 1969
[33] Great Britain
[31] 15,752/69

[54] THERMOPLASTIC GEAR WHEELS
    10 Claims, 1 Drawing Fig.
[52] U.S. Cl. .................................................. 74/439,
                                                      74/467
[51] Int. Cl. ........................................... F16h 55/12,
                                                      F16h 57/04
[50] Field of Search ........................................... 74/439,
                                                      434, 467

[56] References Cited
    UNITED STATES PATENTS
    2,986,954  6/1961  Werner ......................... 74/439 X
    3,082,485  3/1963  Thomas ......................... 18/59

Primary Examiner—Leonard H. Gerin
Attorney—Cushman, Darby & Cushman

ABSTRACT: A laminar gear wheel consisting of a core of a polyamide and surface skins of a polyamide containing a lubricant.

PATENTED DEC 28 1971
3,630,098
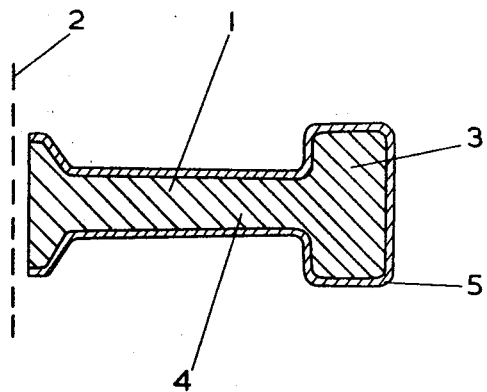
INVENTOR
DAVID FAIRCLOUGH OXLEY
BY
Cushman, Darby & Cushman
ATTORNEYS

THERMOPLASTIC GEAR WHEELS

The present invention relates to improved thermoplastic gear wheels.

According to the present invention we provide a laminar gear wheel having a core of a polyamide which is substantially free from molybdenum sulfide and polytetrafluoroethylene integrally moulded with substantially continuous surface skins of a polyamide containing up to 25 percent by weight of the skin-forming polyamide material of molybdenum sulfide or polytetrafluoroethylene.

The gear wheels of the present invention are preferably prepared by an injection moulding process in which a charge of a polyamide containing molybdenum sulfide or polytetrafluoroethylene is first injected into a mould and subsequently, and before the first charge has set, injecting a charge of polyamide which is free from molybdenum sulfide and polytetrafluoroethylene into the center of the first charge in the mould. In this two-stage injection moulding process the area on the surface of the gear wheel corresponding to the position at which the materials are injected into the mould will consist of polyamide which is free from molybdenum sulfide and polytetrafluoroethylene. Such gear wheels are considered to have substantially continuous surface skins of the polyamide containing molybdenum sulfide or polytetrafluoroethylene. However, in a preferred process for preparing the gear wheels of the present invention by injection moulding, a second charge of the polyamide containing molybdenum sulfide or polytetrafluoroethylene is injected after the charge which is free from these ingredients. This has the advantage that it ensures that the skin is entirely of the polyamide containing molybdenum sulfide or polytetrafluoroethylene and that any material remaining in the sprue of the moulding machine contains polytetrafluoroethylene and/or molybdenum sulfide.

The polyamides which are used in the production of the gear wheels of the present invention may be any of the well-known nylons such as nylon 6, nylon 66, nylon 610 or copolymers such as copolymers of nylon 6 and nylon 66. Any of these polyamides may be used as the core-forming polytetrafluoroethylene or molybdenum sulfide-free material or the skin-forming material and the two polyamides may be the same or different. The skin-forming polyamide which contains polytetrafluoroethylene or molybdenum sulfide may also contain a reinforcing filler in particular carbon fibers which enables particularly strong gear wheels to be obtained. The core-forming polyamide of the gear wheels of the present invention may also contain a reinforcing filler to impart improved stiffness to the gear wheel. If the gear wheels are to be used in damp conditions we prefer that the skin forming polyamide is free from reinforcing fillers and the core contains a reinforcing filler as this produces strong gear wheels with low water absorption. Examples of suitable reinforcing fillers include carbon, glass and asbestos fibers and glass and mica plates.

The principal advantage of the present invention is an economic one in that it is possible to produce gear wheels which possess the advantage of high lubrication and thus improved wear resistance achieved by the incorporation of polytetrafluoroethylene or molybdenum disulfide without the need to incorporate these materials throughout the polyamide. Thus, small amounts may be used which results in considerable financial saving. We prefer to use at least 5 percent by weight of the core-forming polyamide of molybdenum sulfide or polytetrafluoroethylene. Additionally, it is possible to choose the skin- and core-forming polyamides so that the gear wheels are well lubricated but at the same time have good impact properties due to the core-forming material.

The single FIG. of drawing is a cross-sectional view of a portion of a gear wheel, showing the flange and tooth portions of the gear wheel.

A cross section of one tooth of a gear wheel according to the present invention is illustrated but in no way limited by the attached drawing and consists of a flange 1 extending from the axis 2 of the gear wheel to the load bearing area 3. The core of the gear wheel 4 is of glass filled nylon sheathed with a layer 5 of nylon filled with polytetrafluoroethylene which defines the load-bearing surfaces of the gear wheel.

I claim:

1. An injection moulded laminar gear wheel having (1) a core of a polyamide which is substantially free from molybdenum sulfide or polytetrafluoroethylene and (2) substantially continuous surface skins of a polyamide, said skins being integrally injection moulded with said core, and said skins containing up to 25 percent by weight of the skin-forming polyamide material of molybdenum sulfide or polytetrafluoroethylene.

2. A laminar gear wheel according to claim 1 in which the polyamides are the same or different and are selected from the group consisting of nylon 6, nylon 66, nylon 610 and copolymers of nylon 6 and nylon 66.

3. A laminar gear wheel according to claim 1 in which the core-forming polyamide contains a reinforcing filler to impart improved stiffness to the gear wheel.

4. A laminar gear wheel according to claim 3 in which the reinforcing filler is asbestos fiber.

5. A laminar gear wheel according to claim 3 in which the reinforcing filler is glass fiber.

6. A laminar gear wheel according to claim 3 in which the reinforcing filler is carbon fiber.

7. A laminar gear wheel according to claim 3 in which the reinforcing filler consists of glass plates.

8. A laminar gear wheel according to claim 3 in which the reinforcing filler consists of mica plates.

9. A laminar gear wheel according to claim 1 in which the skin-forming polyamide also contains a reinforcing filler.

10. A laminar gear wheel according to claim 9 in which the reinforcing filler is carbon fiber.

* * * * *